United States Patent [19]

Kosik et al.

[11] Patent Number: 5,704,872

[45] Date of Patent: Jan. 6, 1998

[54] AUTOMATIC VEHICLE CLUTCH CONTROL

[75] Inventors: Franz Kosik, Ostfildern; Günter Wörner, Kemen, both of Germany

[73] Assignee: Mercedes Benz AG, Stuttgart, Germany

[21] Appl. No.: 699,666

[22] Filed: Aug. 19, 1996

[30] Foreign Application Priority Data

Aug. 21, 1995 [DE] Germany ............... 195 30 611.2

[51] Int. Cl.$^6$ ................................................. B60K 41/02
[52] U.S. Cl. .................................. 477/74; 477/176
[58] Field of Search .................. 477/74, 171, 175, 477/176

[56] References Cited

U.S. PATENT DOCUMENTS

| | | | |
|---|---|---|---|
| 5,050,714 | 9/1991 | Kurihara et al. | 477/176 |
| 5,056,639 | 10/1991 | Petzold et al. | 477/176 |
| 5,067,599 | 11/1991 | Roder et al. | 477/176 |
| 5,082,096 | 1/1992 | Yamashita et al. | 477/175 |
| 5,322,150 | 6/1994 | Schmidt-brucken et al. | 477/176 |
| 5,378,211 | 1/1995 | Slicker et al. | 477/176 |

FOREIGN PATENT DOCUMENTS

| | | |
|---|---|---|
| 0 153 051 | 8/1985 | European Pat. Off. . |
| 34 30 983 | 3/1986 | Germany . |
| 44 26 260 | 2/1995 | Germany . |

OTHER PUBLICATIONS

G.L. Falzoni et al., Microprocessor Clutch Control, pp. 115–125, Fiat Car Co.

*Primary Examiner*—Dirk Wright
*Attorney, Agent, or Firm*—Klaus J. Bach

[57] ABSTRACT

In a method of controlling an automatic clutch arranged between an engine and a drive train of a vehicle in vehicle startup situations wherein the clutch is engaged to such a degree that only a small torque can be transmitted through the clutch and wherein the clutch is increasingly engaged when engine power output is increased, the clutch is immediately returned toward disengagement if, during vehicle startup, the engine power output requirements are suddenly reduced and, after a predetermined delay, the clutch is adjusted to the new situation that is to a standstill of the vehicle or to a renewed startup situation.

4 Claims, 1 Drawing Sheet

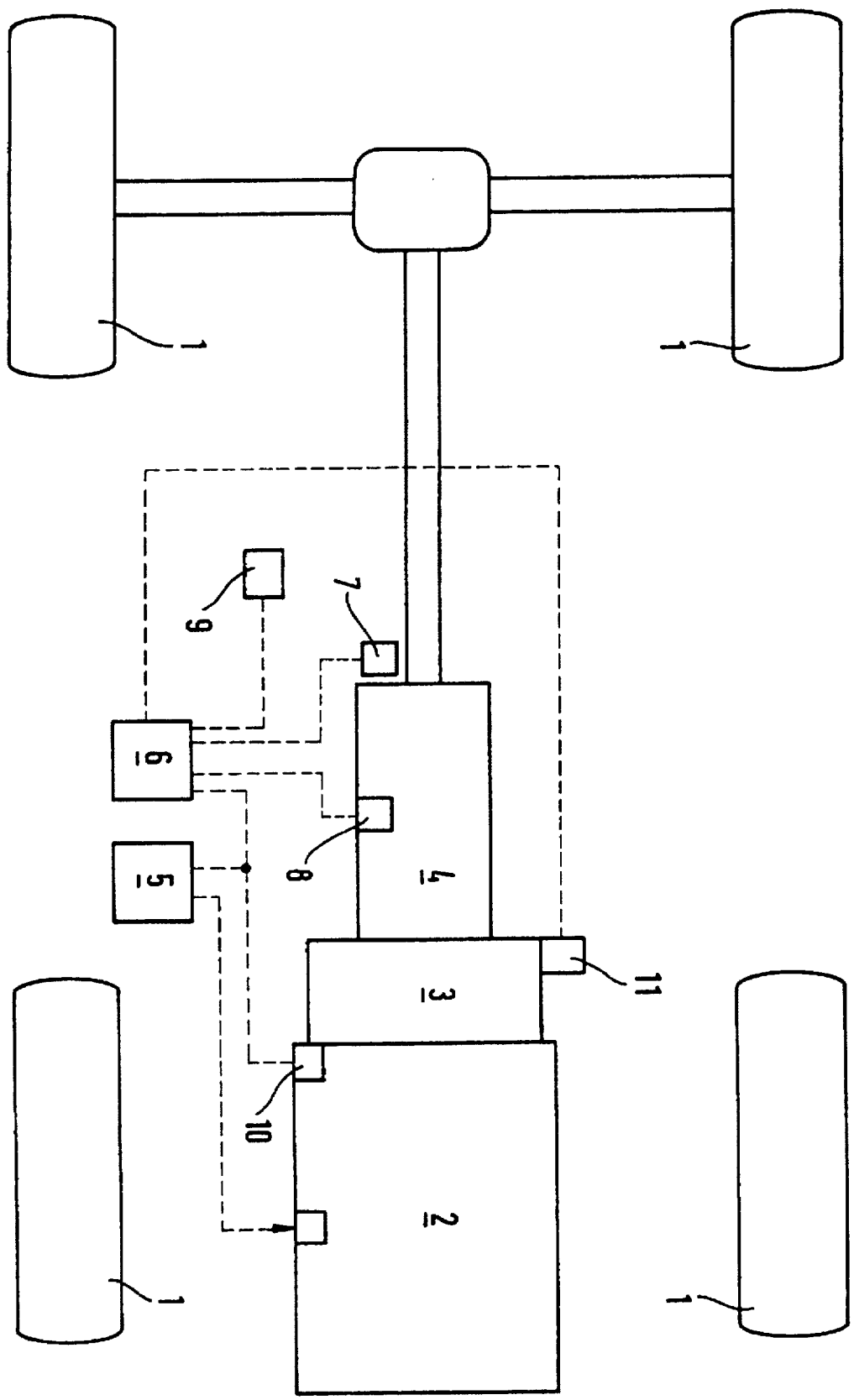

AUTOMATIC VEHICLE CLUTCH CONTROL

BACKGROUND OF THE INVENTION

The invention relates to a method of controlling an automatic clutch which is arranged between a motor, particularly an internal combustion engine, which is controllable by a control member, and a drive train of a vehicle including a transmission wherein during startup under certain operating conditions the clutch is fully disengaged.

Vehicles with manual transmissions and automatically operated clutches are generally known and are manufactured in series.

According to the publication "MICROPROCESSOR CLUTCH CONTROL", SAE paper 83 0628 (1987), an automatic clutch should be operated automatically in a way which approaches optimal clutch operation of a non-automatic clutch by a good driver. To achieve this, in accordance with this publication, during starting the clutch torque is controlled when the engine control element (gas pedal) is actuated depending on various parameters, particularly on the transmission input and output shaft speeds. In addition, a sensor arrangement is provided by which it can be determined whether the driver, when starting, suddenly releases the gas pedal. In such a case, the clutch is disengaged.

EP 0 153 051 discloses a motor vehicle with an automatic clutch and a mechanical transmission whose transmission ratio is infinitely variable. If, in this arrangement, the gas pedal is not actuated, the automatic clutch is controlled in dependence on the vehicle speed: above a certain upper transmission shaft speed threshold value, the clutch is disengaged and below a lower threshold value, the clutch is slightly engaged such that the torque transmitted by the clutch is sufficient to compensate for the friction of the transmission. As soon as the gas pedal is actuated, the clutch operates below the upper speed threshold value in dependence on the vehicle speed and the position of the gas pedal. Above the upper threshold value the clutch is engaged. As a result of the clutch being fully disengaged in the speed range between the two threshold values if the gas pedal is not actuated, the engine cannot be stalled. If, with a vehicle with infinitely variable transmission, the gas pedal is released, the transmission ratio will immediately change such that the engine speed is increasingly reduced while the vehicle speed remains the same. With a fully released gas pedal and fully engaged clutch, this could lead to a condition where the engine, at speeds below the upper threshold value, would be forced into a speed range in which smooth engine operation would no longer be warranted and stalling of the engine could be expected.

It is known from DE 44 26 260 A1 to monitor a startup action, such as the actuation of a control pedal which controls engine output, placing a startup stage into operation, or placing the transmission in first gear or in reverse, in order to recognize a startup situation. If the brake is not operated and the transmission is in a gear suitable for starting or a respective transmission stage is activated and if the vehicle is at a stand-still or close to a stand-still, the essential conditions for determining a start up situation are given and accordingly, the clutch is controlled so as to transmit only a relatively small torque by which the vehicle moves only at creeping speed. As soon as the engine output is increased for example by an increase of the gas pedal actuation, the clutch is further engaged. If, at a vehicle stand-still or very slow speed, the vehicle brake is actuated, the clutch can again be disengage a such that again only a relatively small torque can be transmitted through the clutch.

DE 34 30 983 A1 discloses an arrangement wherein the clutch can be fully disengaged only below a low vehicle speed threshold value.

However, none of the automatic clutches known in the art takes the abortion of a startup into proper consideration. It is noted in this connection that the vehicle can still be accelerated before braking action takes over if the driver is forced during startup to suddenly step on the brake.

It is therefore the object of the present invention to provide a method of controlling an automatic clutch in such a way that dangerous situations during startup can be handled by the automatic clutch control in a better and safer manner as it is possible with clutch control methods known so far.

SUMMARY OF THE INVENTION

In a method of controlling an automatic clutch arranged between an engine and a drive train of a vehicle in vehicle startup situations wherein the clutch is engaged to such a degree that only a small torque can be transmitted through the clutch and wherein the clutch is increasingly engaged when engine power output is increased, the clutch is immediately returned toward disengagement if, during vehicle startup, the engine power output requirements are suddenly reduced and, after a predetermined delay, the clutch is adjusted to the new situation that is to a stand-still of the vehicle or to a renewed startup situation.

The invention is based on the general idea that the clutch is automatically sufficiently disengaged when the startup procedure is aborted by the driver such that a possible subsequent braking procedure is facilitated. To determine whether startup was aborted, it is assumed that a return of the engine power control member, for example a release of the gas pedal or the throttle valve of the engine, during the startup phase very likely means that the startup is to be aborted so that such an action can be taken as a signal source for operating the clutch.

In order to safely avoid free-wheeling of the vehicle, it may be provided in a preferred embodiment of the invention that the automatic clutch can be fully disengaged only if the vehicle speed falls below a certain low threshold value.

The invention will become more readily apparent from the following description of preferred embodiments thereof on the basis of the accompanying drawing.

BRIEF DESCRIPTION OF THE DRAWINGS

The sole figure shows schematically a vehicle using the automatic clutch control according to the invention.

DESCRIPTION OF PREFERRED EMBODIMENTS

The figure shows of the vehicle essentially only the wheels 1 and an engine 2 which operates the rear vehicle wheels by way of an automatic clutch 3 and a manual transmission 4. The engine 2 includes an automatic engine control unit 5 which operates in a well known manner and which at least provides an engine control such that at least a certain engine minimum speed—generally the engine idle speed—is maintained independently of the engine load. Furthermore, there is a control unit 6 for the automatic clutch 3 which however may be included in the engine control unit 5 whereby only a single control unit would be present.

At the input side, the control unit 6 is connected to a vehicle speed sensor 7 such as a speedometer and to a sensor 8 which indicates in which gear the transmission is engaged. Another sensor 9 is associated with the vehicle brake system (not shown) and a sensor 10 informs the control unit of the position of the engine power output control element such as the position of the driver operated gas pedal or of the throttle valve coupled with the gas pedal.

At is output side, the control unit 6 is connected to a preferably electrical position controller 11 for operating the automatic clutch.

As soon as the control unit 6 recognizes a startup situation for example when the sensor 7 indicates a stand-still or almost a stand-still of the vehicle, the sensor 8 senses that a gear suitable for startup is engaged or the transmission 4 is at a stage suitable for startup and the sensor 9 indicates that the vehicle brake is not actuated, the clutch 3 is operated by the position controller 11 to a point where it is capable of transmitting a limited torque suitable for creeping movement of the vehicle. If then the power output of the engine is increased, that is if the engine power control element monitored by the sensor 10 is actuated to increase the engine power output and/or if the vehicle speed monitored by the sensor 7 increases, the clutch is increasingly engaged until it is fully engaged.

If now, during startup, the driver releases the engine power output control member, that is, if he releases the gas pedal so that the engine throttle valve connected thereto is returned to a lower engine output position, the control unit 6 takes such action as a desire to abort the startup process, at least if the release of the engine power output control member occurs rapidly and/or the control member is returned to a position below a small threshold value and/or the vehicle speed is still below a certain threshold value.

Then the control unit 6 provides for an immediate complete or almost complete disengagement of the clutch 3 so that the system is prepared for a subsequent braking action by the driver.

What is claimed is:

1. A method of controlling an automatic clutch arranged between a motor, especially an internal combustion engine, and a drive train of a vehicle in vehicle startup situations, wherein said clutch is automatically engaged to such a degree that only a small torque can be transmitted by the clutch which results in no more than creeping motion of said vehicle but wherein said clutch is increasingly engaged when an engine power output control member is actuated for increased engine power output, and wherein said clutch is immediately returned toward disengagement if, during vehicle startup, said engine power output control member is released and said clutch is then, after a predetermined delay, controlled in adaptation to the new situation—that is to a stand-still of the vehicle with brakes applied or to a renewed startup situation.

2. A control method according to claim 1, wherein said clutch is fully disengaged only if the engine power output control element is returned to a position below a predetermined threshold value and/or the return of the engine power output control element to below said predetermined threshold value occurs rapidly.

3. A control method according to claim 1, wherein said clutch is fully disengaged only if the vehicle speed falls below a predetermined small threshold value.

4. A control method according to claim 3, wherein said predetermined small threshold value at which said clutch is fully disengaged depends on the gear in which a transmission disposed in the drive train of the vehicle is engaged.

* * * * *